United States Patent
Kerns

(10) Patent No.: US 8,429,207 B2
(45) Date of Patent: *Apr. 23, 2013

(54) METHODS FOR IMPLEMENTATION OF INFORMATION AUDIT TRAIL TRACKING AND REPORTING IN A STORAGE SYSTEM

(75) Inventor: Randy Kerns, Boulder, CO (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,941

(22) Filed: Dec. 20, 2011

(65) Prior Publication Data

US 2012/0089575 A1   Apr. 12, 2012

Related U.S. Application Data

(63) Continuation of application No. 12/199,324, filed on Aug. 27, 2008, now Pat. No. 8,103, 616.

(60) Provisional application No. 60/977,766, filed on Oct. 5, 2007.

(51) Int. Cl.
    *G06F 17/30* (2006.01)

(52) U.S. Cl.
    USPC ........... 707/812; 707/769; 707/770; 709/217; 709/220; 709/221; 709/222; 709/223; 709/224; 711/161; 711/173

(58) Field of Classification Search .............. 707/912; 709/217, 220–224; 711/161, 173
    See application file for complete search history.

(56) References Cited

U.S. PATENT DOCUMENTS

| | | | |
|---|---|---|---|
| 5,794,252 A * | 8/1998 | Bailey et al. | 707/610 |
| 6,779,080 B2 | 8/2004 | Basham et al. | |
| 7,107,416 B2 | 9/2006 | Stuart et al. | |
| 7,529,816 B2 * | 5/2009 | Hayden et al. | 709/220 |
| 7,574,501 B2 * | 8/2009 | Louie et al. | 709/224 |
| 8,103,616 B2 * | 1/2012 | Kerns | 707/600 |
| 2003/0187863 A1 | 10/2003 | Kohut et al. | |
| 2005/0149682 A1 * | 7/2005 | Kim | 711/161 |
| 2005/0267920 A1 * | 12/2005 | Helliker et al. | 707/204 |
| 2006/0010301 A1 | 1/2006 | Yagawa | |
| 2006/0123232 A1 | 6/2006 | Cannon et al. | |
| 2006/0178281 A1 | 8/2006 | Alasri | |
| 2007/0192478 A1 * | 8/2007 | Louie et al. | 709/224 |
| 2008/0059444 A1 * | 3/2008 | Singh et al. | 707/4 |
| 2008/0059531 A1 * | 3/2008 | Singh et al. | 707/104.1 |
| 2008/0155208 A1 | 6/2008 | Hiltgen et al. | |
| 2008/0178281 A1 | 7/2008 | Narayanaswami et al. | |
| 2009/0013409 A1 | 1/2009 | Wenzinger et al. | |
| 2009/0094228 A1 | 4/2009 | Bondurant et al. | |

OTHER PUBLICATIONS

"Digital File Shredder Pro—Military and Professional Grade Data Shredding for Consumers," California Science and Technology News, Oct. 7, 2005, retrieved from Internet, 1 page.

* cited by examiner

*Primary Examiner* — Frantz Coby

(74) *Attorney, Agent, or Firm* — Kenneth E. Levitt; Dorsey & Whitney LLP

(57) ABSTRACT

Embodiments of archival storage system are disclosed. The archival storage system includes one or more removable disk drives that provide random access and are readily expandable. One or more application servers can store archival data to the one or more removable disk drives. Further, the archival storage system provides an audit trail that stores information about actions taken on the archival data. The audit trail data providing a list of the actions and information about the actions that can be used to determine changes to the archival data.

22 Claims, 12 Drawing Sheets

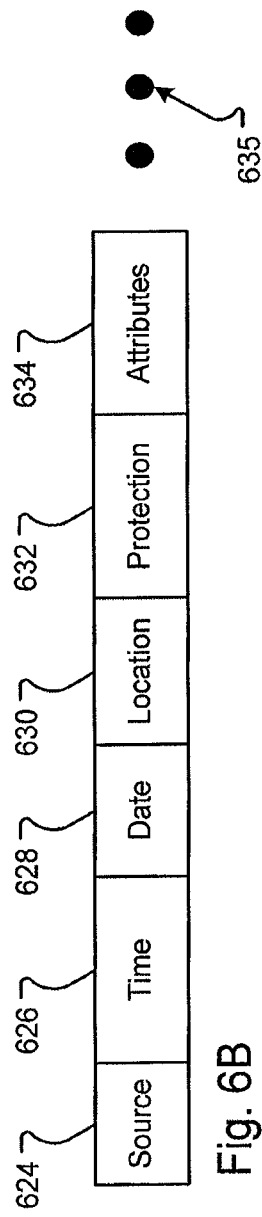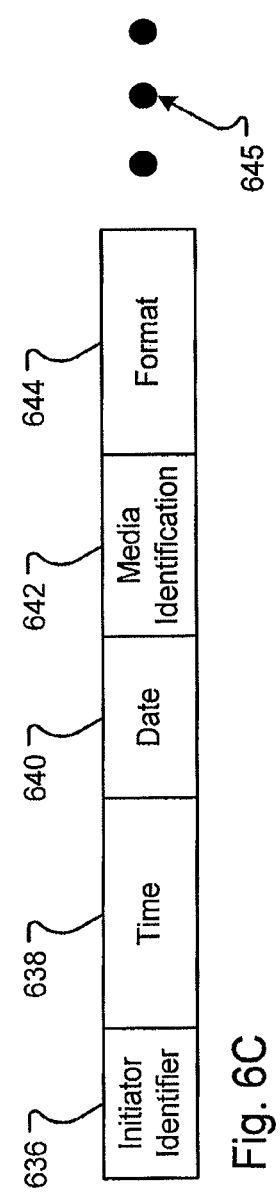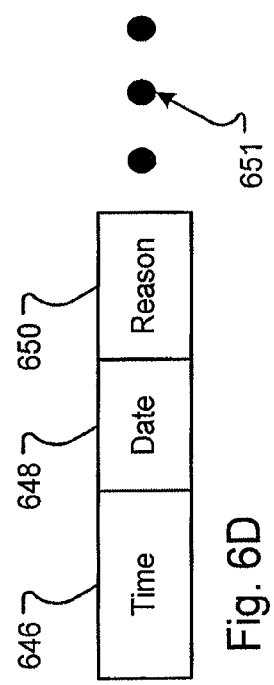
Fig. 6B
Fig. 6C
Fig. 6D

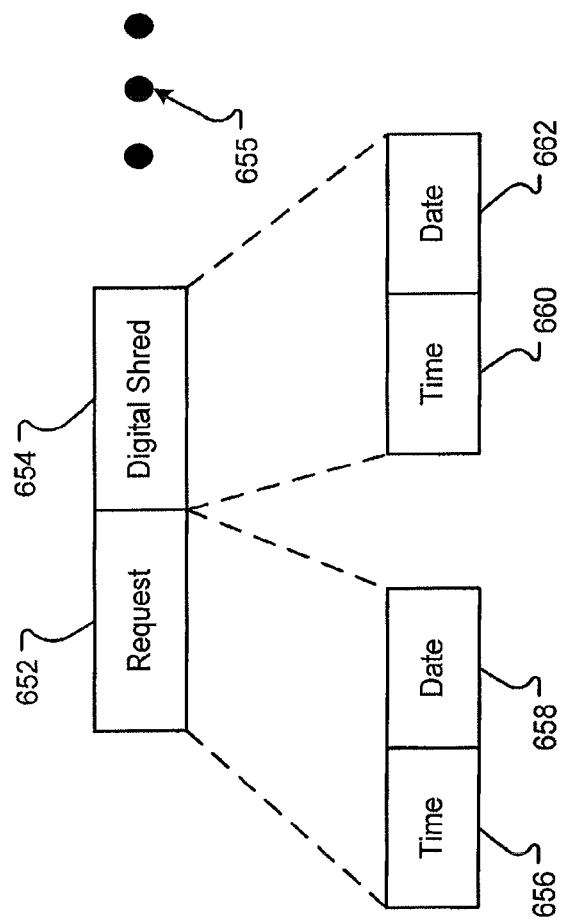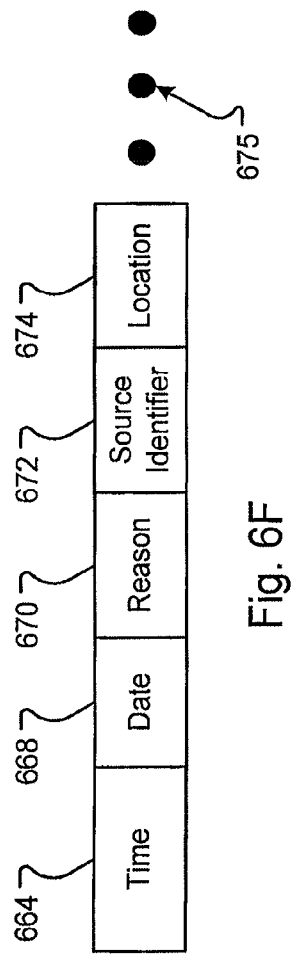

METHODS FOR IMPLEMENTATION OF INFORMATION AUDIT TRAIL TRACKING AND REPORTING IN A STORAGE SYSTEM

CROSS-REFERENCES TO RELATED APPLICATIONS

This application is a continuation of U.S. patent application Ser. No. 12/199,324, filed Aug. 27, 2008, issued Jan. 24, 2012 as U.S. Pat. No. 8,103,616, which claims priority to U.S. Provisional Patent Application Ser. No. 60/977,766, filed Oct. 5, 2007, entitled METHODS FOR IMPLEMENTATION OF INFORMATION AUDIT TRAIL TRACKING AND REPORTING IN A STORAGE SYSTEM, all of which are hereby incorporated by reference herein in their entirety.

BACKGROUND OF THE INVENTION

Embodiments of the disclosure generally relate to storage systems and, more specifically, but not by way of limitation, to archiving storage systems.

An archiving storage system is used by one or more applications or application servers to store data for longer periods of time, for example, one year. Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage. However, at present, current archiving systems suffer from inadequacies.

Many organizations, such as the United States Courts, require an understanding of how certain data was handled before submission to the court. As such, an accounting of who, when, where, and why the data was stored, accessed, handled, etc., is often required. Generally, current archiving systems cannot provide this data and store the data to the media without regard to who or why the data is stored. Likewise, many archiving systems allow unfettered access to the data once archived.

It is in view of these and other considerations not mentioned herein that the embodiments of the present disclosure were envisioned.

BRIEF DESCRIPTION OF THE DRAWINGS

The present disclosure is described in conjunction with the appended figures:

FIGS. 6A-H are block diagrams of embodiments of an audit trail;

Figure 1:
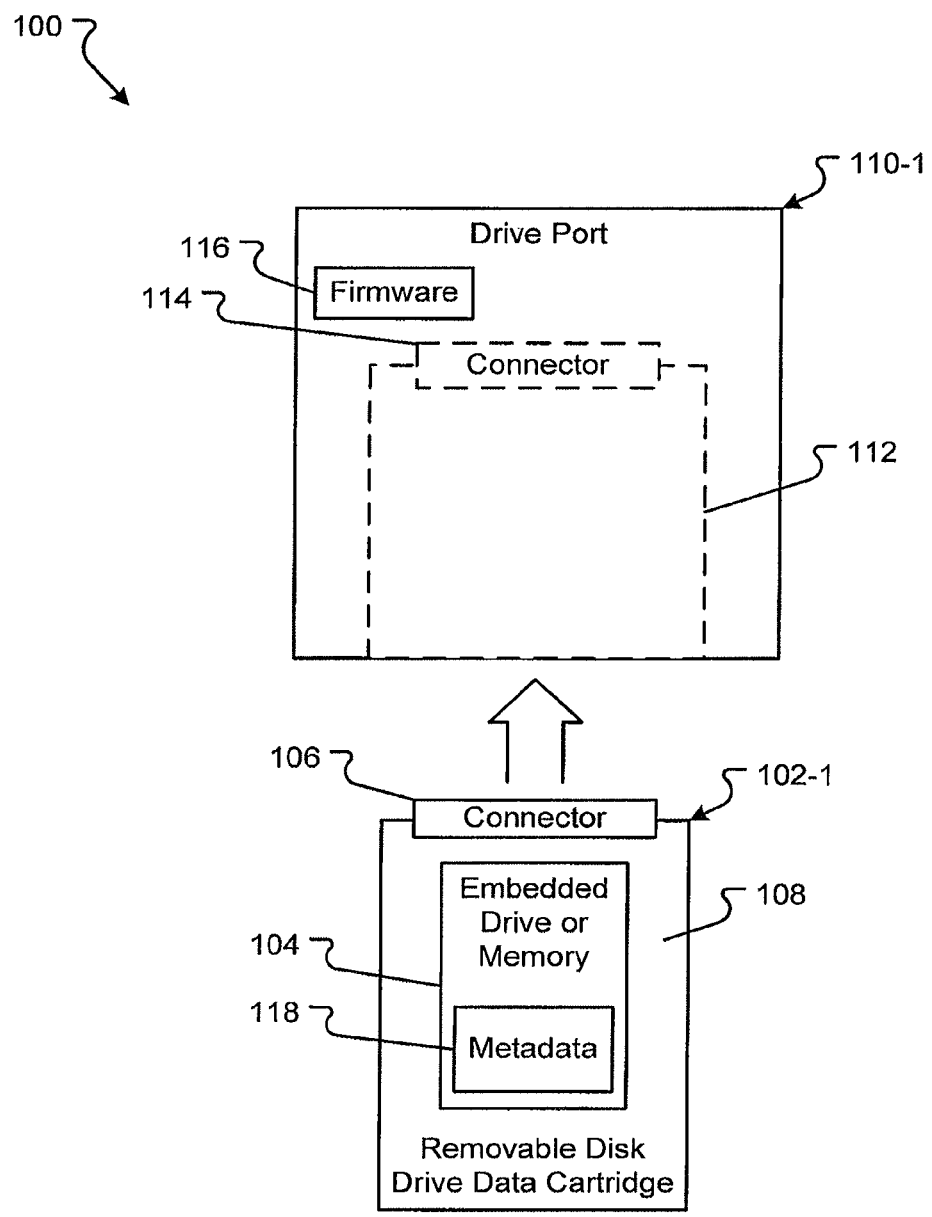
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment of the disclosure. It being understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Embodiments of the present disclosure provide a unique and novel hardware architecture for archiving data. Embodiments include an archiving system having disk drives embedded in removable cartridges. The removable disk drives allow for expandability and replacement such that the archiving system in embodiments need not be duplicated to add new or more storage capacity. Further, the removable disk drives provide advantages in speed and data access because, in embodiments, the data is stored and retrieved by random access rather than sequential access. In further embodiments, an audit trail is generated and stored for actions associated with the archived data stored in the removable disk drives. The audit trail may not be manually or physically maintained, such as on a paper report, allowing more flexibility for the archiving system. These and further advantages will be evident to one skilled in the art from a review of the detailed description provided herein.

An embodiment of a removable disk system 100 to provide long-term archival data storage is shown in FIG. 1. A removable disk drive 102-1 provides storage capability for the removable disk system 100. In embodiments, the removable disk drive 102-1 includes a data cartridge case 108 and an embedded memory 104, which may be an embedded hard disk drive (HDD), a solid state disk (SSD), a solid state drive, or flash memory. The HDD, SDD, or flash memory provides a random access memory for storage of archived data. The embedded memory 104 is in communication with and/or electrically connected to a connector 106. In one embodiment, the connector 106 is a Serial Advanced Technology Attachment (SATA) connector. In other embodiments, the connector 106 is a Universal Serial Bus (USB) connector, parallel connector, Firewire connector, or other connector. Both the embedded memory 104 and connector 106 are, in embodiments, physically attached to the data cartridge case 108, and, in some embodiments, enclosed by, protected by, physically connected, or integrated into the data cartridge case 108. In other embodiments. embedded memory 104 is physically integrated with the connector 106 in a single physical structure, with the connector 106 protruding from the data cartridge case 108.

In embodiments, the archiving system 100 contains a drive port 110-1 that includes one or more docking ports or cartridge holders 112, each with a data cartridge connector 114 to receive the removable disk drive 102-1. The data cartridge connector 114 mates with the electrical connector 106 of the removable disk drive 102-1 to provide electrical power to the removable disk drive 102-1 and/or to communicate with the embedded memory 104 in the removable disk drive 102-1. As with the connector 106, the data cartridge connector 114 may be a SATA connector or another type of connector. Regardless, the data cartridge connector 114 and the electrical connector 106 can be connected. The docking port 112 allows the removable disk drive 102-1 to be easily inserted and removed as necessary. In embodiments, the drive port 110-1 includes two or more drive ports 112 to allow for the use, control, and communication with two or more removable disk drives 102-1. Each docking port 112, in embodiments, is separately addressable to allow for customized control over each removable disk drive 102-1 connected to each docking port 112.

Thus, as removable disk drives 102-1 are replaced, the same configuration can be applied to the newly inserted removable disk drive 102-1 because the drive port 110-1 is addressed instead of the removable disk drive 102-1. More description regarding customizable control is provided in conjunction with FIGS. 3 and 4.

The embedded memory 104, in embodiments, includes metadata 118 stored thereon. The metadata 118 can comprise one or more of but is not limited to, cartridge and/or HDD identification, encryption keys or data, other security information, information regarding data stored on the HDD, information about the data format used for the HDD, etc. The metadata 118 may be read and used by the firmware 116 of the drive port 110-1. The firmware 116 may be hardware and/or software resident in the drive port 110-1 for controlling the removable disk drive 102-1. In embodiments, the firmware 116 contains the necessary software and/or hardware to power-up the removable disk drive 102-1, spin-up the disk platters in the embedded memory 104, read and write to the embedded memory 104, read, write and process the metadata 118, etc. For example, the firmware 116 could read the metadata 118 to identify the removable disk drive 102-1 and gather information related to its contents.

In embodiments, the archiving system 100 operates to receive one or more removable disk drives 102-1 in one or more docking ports 112. The electrical connector 106 connects or couples with the data cartridge connector 114 to form an electrical connection that allows the drive port 110-1 to communicate with the embedded memory 104. The firmware 116 powers-up the embedded memory 104 and begins any initialization processes (e.g., security processes, identification processes, reading and/or writing to the metadata 118, etc.). The drive port 110-1, which, in embodiments, is in communication with a network, receives data from one or more servers, applications, or other systems on the network. The firmware 116 writes the data to the embedded memory 104 of the removable disk drive 102-1 to archive the data.

Figure 2:
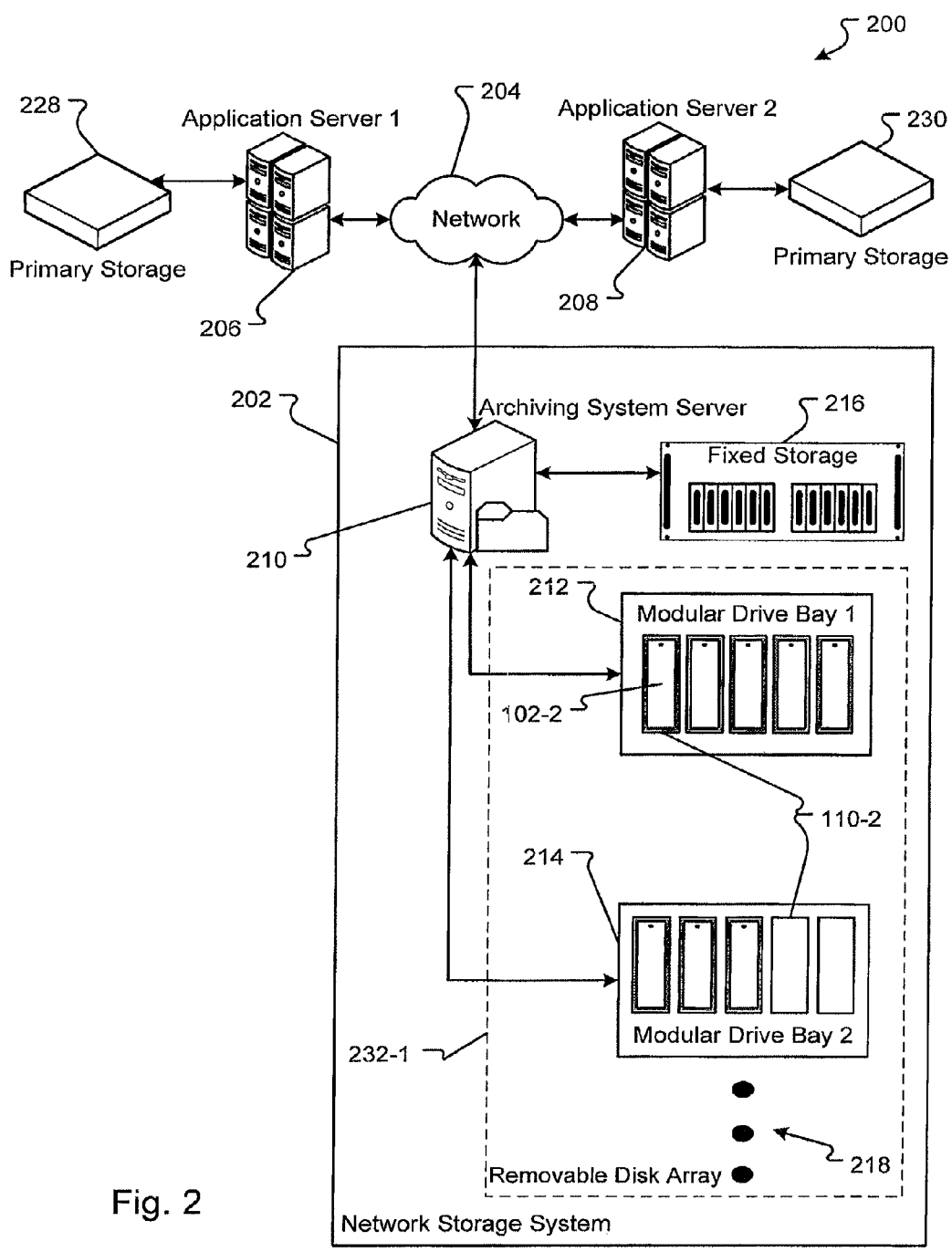
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices, and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, and hardware devices that may store archived data will be referred to as an application or application server. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes a archiving system appliance 210 and one or more removable disk drives 102-2 connected or in communication with a drive port 110-2. In alternative embodiments, a modular drive bay 212 and/or 214 includes two or more drive ports 110-2 that can each connect with a removable disk drive 102-2. Thus, the modular drive bays 212 and 214 provide added storage capacity because more than one removable disk drive 102-2 can be inserted and accessed using the same archiving system appliance 210. Further, each drive port 110-2 in the modular drive bays 212 and 214 is, in embodiments, separately addressable allowing the archiving system appliance 210 to configure the removable disk drives 102-2 in the modular drive bays 212 and 214 into groups of one or more removable disk drives 102-2. Two or more modular drive bays 212 and 214; in embodiments, are included in the network storage system 202, as evidenced by the ellipses 218. Thus, as more data storage capacity is required, more modular drive bays may be added to the network storage system 202.

The exemplary hardware architecture in FIG. 2 provides near limitless capacity as more removable disk drives 102-2 can be added to existing modular drive bays 212 or 214 until the modular drive bays 212 and 214 hold all possible removable disk drives 102-2, then more modular drive bays are added to the network storage system 202. Further, removable disk drives 102-2 may be replaced as the removable disk drives 102-2 near their storage capacity. The removed disk drives 102-2, in embodiments, are physically stored if and until the data on the removable disk drives 102-2 needs to be retrieved. If the data on the removable disk drive 102-2 needs to be retrieved, the removable disk drive 102-2 may be inserted into one of the drive ports 110-2 of a modular drive bay 212 or 214, and the information retrieved from the connected removable disk drive 102-2.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

The archiving system appliance 210, in embodiments, is a closed system that only allows access, to the network storage system 202, by applications or other systems and excludes access by users. Thus, the archiving system appliance 210 provides protection to the network storage system 202.

In embodiments, the two or more modular drive bays 212 and 214, having each one or more inserted removable disk drives 102-2, form a removable disk array (RDA) 232-1. The archiving system appliance 210 can configure the RDA 232-1 into one or more independent file systems. Each application server 206 or 208, requiring archiving of data, may be provided a view of the RDA 232-1 as one or more independent file systems. In embodiments, the archiving system appliance 210 partitions the RDA 232-1 and associates one or more removable disk drives 102-2 with one or more application layer partition. Thus, the one or more removable disk drives 102-2 comprising the application layer partition appear as an independent file system. For example, the archiving system appliance 210 creates a first application layer partition, e.g., drive "A:\", and a second application layer partition, e.g., drive "B:\". The application layer drives may comprise one or more removable disk drives 102-2. As such, the amount of capacity for each application layer drive can be configured depending on the number of removable disk drives 102-2 included as part of the application layer partition. Further, each application layer partition, in embodiments, has a set of rules or characteristics specific to the drive. For example, if the drive stores a certain type of information that requires the data to be eliminated every year, the data on the application layer partition may be eliminated once a year. In embodiments, a user may configure how the application layer partitions are created and the storage requirements for each application layer partition.

In further embodiments, the archiving system appliance 210 provides an interface for application server 1 206 and application server 2 208 that allows the application servers 206 and 208 to communicate archival data to the network storage system 202. The archiving system appliance 210, in embodiments, determines where and how to store the data in a removable disk drive 102-2. For example, the application server 1 206 stores archival data in a first application layer drive, such as, the first three removable disk drives in modular drive bay 212. The application layer partitions are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture.

In alternative embodiments, the network storage system 202 also comprises a fixed storage 216. The fixed storage 216 may be any type of memory or storage media either internal to the archiving system appliance 210 or configured as a discrete system. For example, the fixed storage 216 can be a Redundant Array of Independent Disks (RAID), such as the Xtore XJ-SA12-316R-B from AIC of Taiwan. The fixed storage 216 provides for storing certain archival data for a shorter period of time where the data may be more easily accessed. In embodiments, the archiving system appliance 210 copies archival data to both the fixed storage 216 and the RDA 232-1. If the data is needed in the short term, the archiving system appliance 210 retrieves the data from the fixed storage 216.

In operation, application server 1 206 stores data into a primary storage 228, which may be a local disk drive or other memory. After some predetermined event, the application server 1 206 reads data from the primary storage 228, packages the data in a format for transport over the network 204 and sends the data to the network storage system 202 to be archived. The archiving system appliance 210 receives the archival data and determines where the data should be stored. The data is then sent to the fixed storage 216 and/or one or more of the removable disk drives 102-2 in one or more of the drive ports 110-2. The data is written to the removable disk drive 102-2 for long-term storage. In further embodiments, application server 2 208 also writes data to a primary storage 230 and sends data to the network storage system 202. In embodiments, the archival data from application server 2 208 is stored to a different removable disk drive 102-2 because the archival data relates to a different application.

Figure 3:
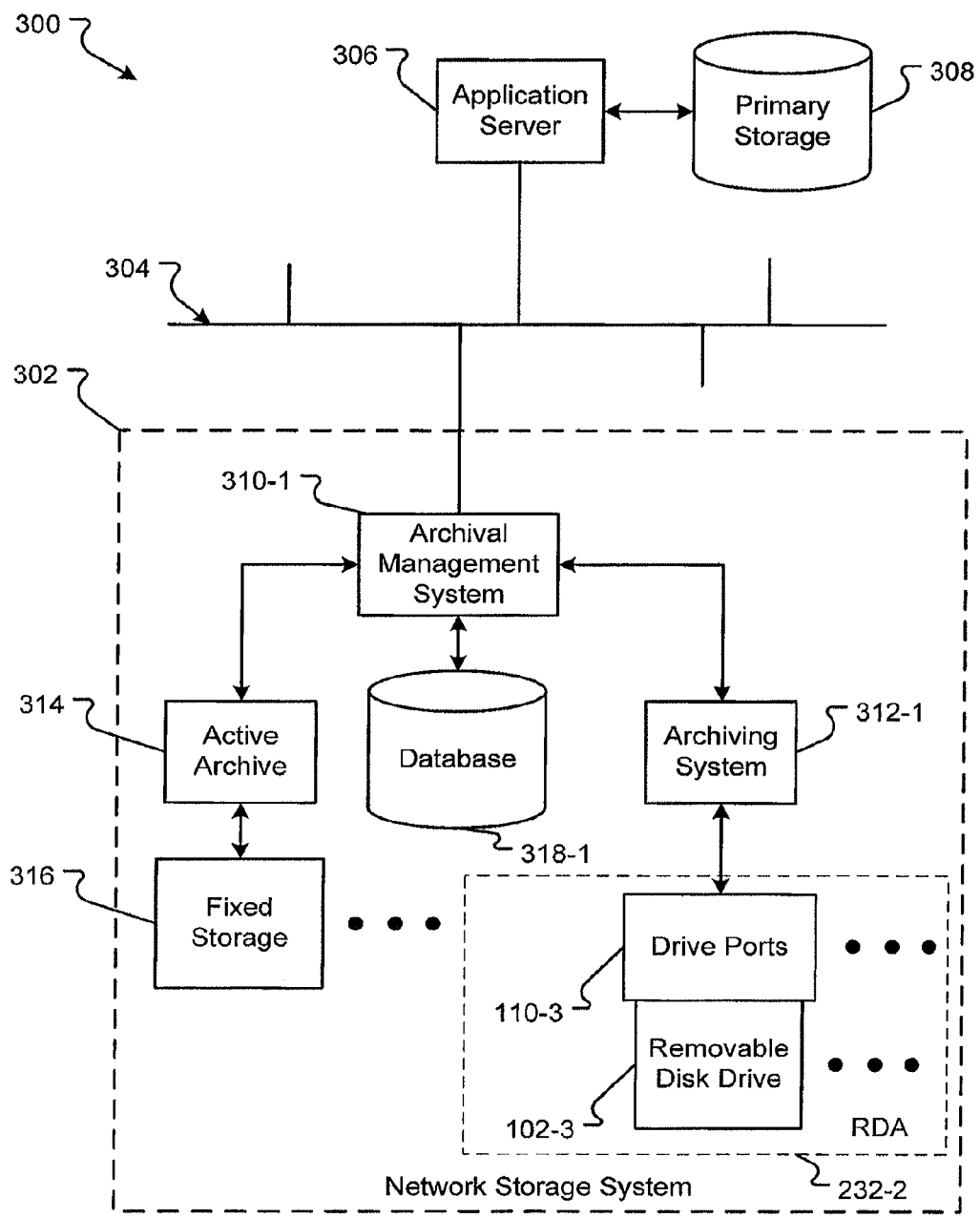
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled or connected to the network. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312-1 in communication with one or more drive ports 110-3 that are in communication with one or more removable disk drives 102-3. The drive port 110-3 and removable disk drives 102-3 are similar in function to those described in conjunction with FIG. 1. The archiving system 312-1 controls the function of the one or more drive ports 110-3 and reads or writes the archived data to one or more predetermined removable disk drives 102-3 in the one or more drive ports 110-3.

In further embodiments, the network storage system 302 comprises an archival management system 310-1. The archival management system 310-1, in embodiments, receives data for archiving from one or more systems on the network 304. Further, the archival management system 310-1 may determine to which system or removable disk drive the data should be archived, in which format the data should be saved, and can provide security for the network storage system 302. In embodiments, the archival management system 310-1 provides a partitioned archive such that the network storage system 302 appears to be an independent file system to the application server 306, yet maintains the archive for multiple application servers. Thus, the archival management system 310-1 manages the network storage system 302 as multiple, independent file systems for one or more application servers 306. In embodiments, the archival management system 310-1 and the archiving system 312-1 are functional components of the archiving system appliance 210 (FIG. 2).

In embodiments, the archival management system 310-1 saves archived data to both the archiving system 312-1 and an active archive 314. The active archive 314, in embodiments, controls, reads from, and writes to one or more fixed storage devices 316 that allow easier access to archived data. In embodiments, fixed storage 316 is similar in function to fixed storage 216 (FIG. 2). The active archive 314 performs similar functions to the archiving system 312-1 but for the fixed storage devices 316. In embodiments, the active archive 314 and the fixed storage devices 316 are components of the hardware fixed storage system 216 (FIG. 2). In alternative embodiments, the active archive 314 is a component of the archiving system appliance 210 (FIG. 2).

The archival management system 310-1 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to by kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310-1 can apply controls to different portions of the RDA 232-2 and/or active archive 314 according to user-established data storage requirements. In one embodiment, the archival management system 310-1 creates application layer partitions in the RDA 232-2 and/or active archive 314 that span one or more removable disk drives 102-3. All data to be stored in any one partition can have the same requirements and controls. Thus, requirements for data storage are applied to different drive ports 110-3 in the modular drive bay 212 (FIG. 2) and to the removable disk drives 102-3 stored in those drive ports 110-3. If a removable disk drive 102-3 is replaced, the same storage requirements, in embodiments, are applied to the replacement removable disk drive 102-3 because of its location in the drive port 110-3. As such, the archival management system 310-1 can individually maintain separate sets of data using different controls, even in different removable disk drives 102-3.

The network storage system 302 may also comprise a database 318-1 in communication with the archival management system 310-1. The database 318-1 is, in embodiments, a memory for storing information related to the data being archived. The database 318-1 may include HDDs, ROM, RAM or other memory either internal to the network storage system 302 and/or the archival management system 310-1 or separate as a discrete component addressable by the archival management system 310-1. The information stored in the database 318-1, in embodiments, includes one or more of, but is not limited to, data identification, application server identification, time of storage, identification of the removable disk drive of where the data was stored, data format, encryption keys, an audit trail, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310-1. The archival management system 310-1, in embodiments, sends the data to one or both of the active archive 314 and/or the archiving system 312-1 to be archived.

Figure 4:
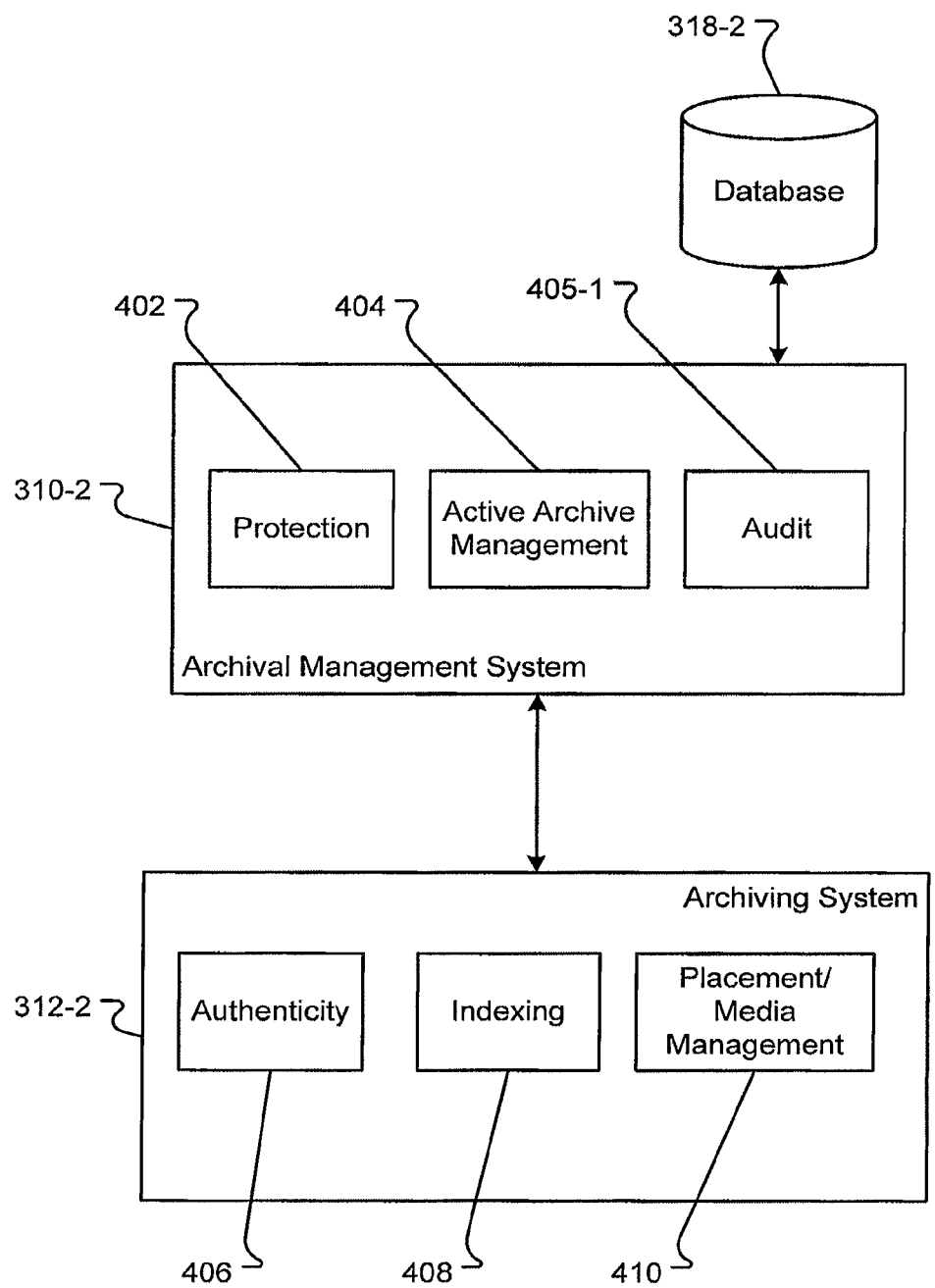
FIG. 4 is a block diagram of embodiments of an archival management system and an archiving system.

Embodiments of an archival management system 310-2 and an archiving system 312-2, including one or more components or modules, are shown in FIG. 4. The archiving system 312-2, in embodiments, includes one or more of an authenticity module 406, an indexing module 408 and/or a placement/media management module 410. In embodiments, the authenticity module 406 determines if a removable disk drive is safe to connect with the archiving system 312-2. For example, the authenticity module 406 may complete an authentication process, such as, AES 256, a public-key encryption process, or other authentication process, using one or more keys to verify that the inserted removable disk drive has access to the archiving system 312-2.

The indexing module 408, in embodiments, creates application layer partitions in the RDA to provide storage areas for different data. For example, the indexing module 408 selects one or more removable disk drives to form one or more "drives". "Drive A:\" may comprise one or more removable disk drives, while "Drive B:\" and "Drive C:\" may also include one or more removable disk drives. In embodiments, each drive is an application layer partition of the RDA. In embodiments, each drive stores only a predetermined type of data that relates to one or more application servers. For Continuing the example above, "Drive A:\" stores email data, while "Drive B:\" stores clinical trial data. In alternative embodiments, the active archive management module 404 also partitions the active archive in a similar manner.

In further embodiments, the indexing module 408 provides controls for each drive. How data is archived for one type of data may be different from how a second type of data is archived. For example, an organization (e.g., the SEC) may require email to be stored for seven (7) years while the FDA may require clinical trial data to be stored for thirty (30) years. The indexing module 408 can manage each drive differently to meet the requirements for the data. For example, the indexing module 408 may store email on drive A:\ for seven years and store clinical trial data on drive B:\ for thirty years. The indexing module 408, in embodiments, stores information about which removable disk drives comprise the separate partitions and enforces the controls on those removable disk drives. Other controls enforced by the indexing module 408 may include the format of data stored on a drive, whether data is encrypted on the removable disk drive, how data is erased on a removable disk drive, etc.

In embodiments, the placement/media management module 410 manages the removable disk drives in the RDA. For example, the placement/media management module 410 determines when cartridges are to be replaced because the removable disk drive is at or near capacity. In embodiments, the placement/media management module 410 also separately addresses the removable disk drives and provides the addressing information to the indexing module 408 for storing data in the correct partition.

Some organizations require that archived data is immutable, that is, the data cannot be overwritten or deleted for a period of time. To ensure data stored in the RDA is immutable, the placement/media management module 410, in embodiments, enforces a Write Once Read Many (WORM) process on the removable disk drives storing immutable data. The WORM process may comprise one or more functions that write data to the removable disk drive in a manner that prevents it from being overwritten, e.g., write protection, sequential writing to disk, etc. Data for an application layer partition may require WORM enforcement according to the indexing module 408. The placement/media management module 410 can determine what disks are associated with the application layer partition needing WORM enforcement and enforce the WORM process on the removable disk drives associated with the application layer partition.

In embodiments, the archival management system 310-2 comprises one or more of a protection module 402, an active archive management module 404, and an audit module 405-1. In embodiments, the protection module 402 protects access to the archiving system 312-2 by applications, application servers, or other components. For example, the protection module 402 prohibits a user from accessing the archiving system 312-2 if the archiving system 312-2 is a closed system. Thus, the protection module 402 may authenticate a system, determine access rights of a system, perform decryption of data, and other processes.

The active archive management module 404, in embodiments, manages data written to and read from the active archive. In embodiments, the active archive management module 404 determines if archival data should be written to the active archive 314 based on information provided by the application server or on information stored in the database 318-2. In further embodiments, the active archive management module 404 determines when data in the active archive 314 (FIG. 3) is removed from the active archive 314 (FIG. 3). According to information in the database 318-2, one or more items of data may only reside in the active archive 314 (FIG. 3) for a predetermined period of time, for example, three months. After the expiration of the predetermined period of time, the data is removed from the active archive 314 (FIG. 3) leaving only the copy stored in the removable disk drives for retrieval.

The audit module 405-1, in embodiments, stores data about archival data stored in the active archiving 314 (FIG. 3) or in the RDA 232-2 (FIG. 3). In embodiments, the audit module 405-1 records information, for example, the application server that sent the data, when the data was received, the type of data, where in the active archiving 314 (FIG. 3) or in the RDA 232-2 (FIG. 3) the data is stored, the period of time the data will be stored in the active archive 314 (FIG. 3) or in the RDA 232-2 (FIG. 3), etc. The audit module 405-1 can provide a "chain of custody" for the archived data by storing the information in the database 318-2. The audit module 405-1 and its functions are described in more detail in conjunction with FIGS. 5-9.

Figure 5:
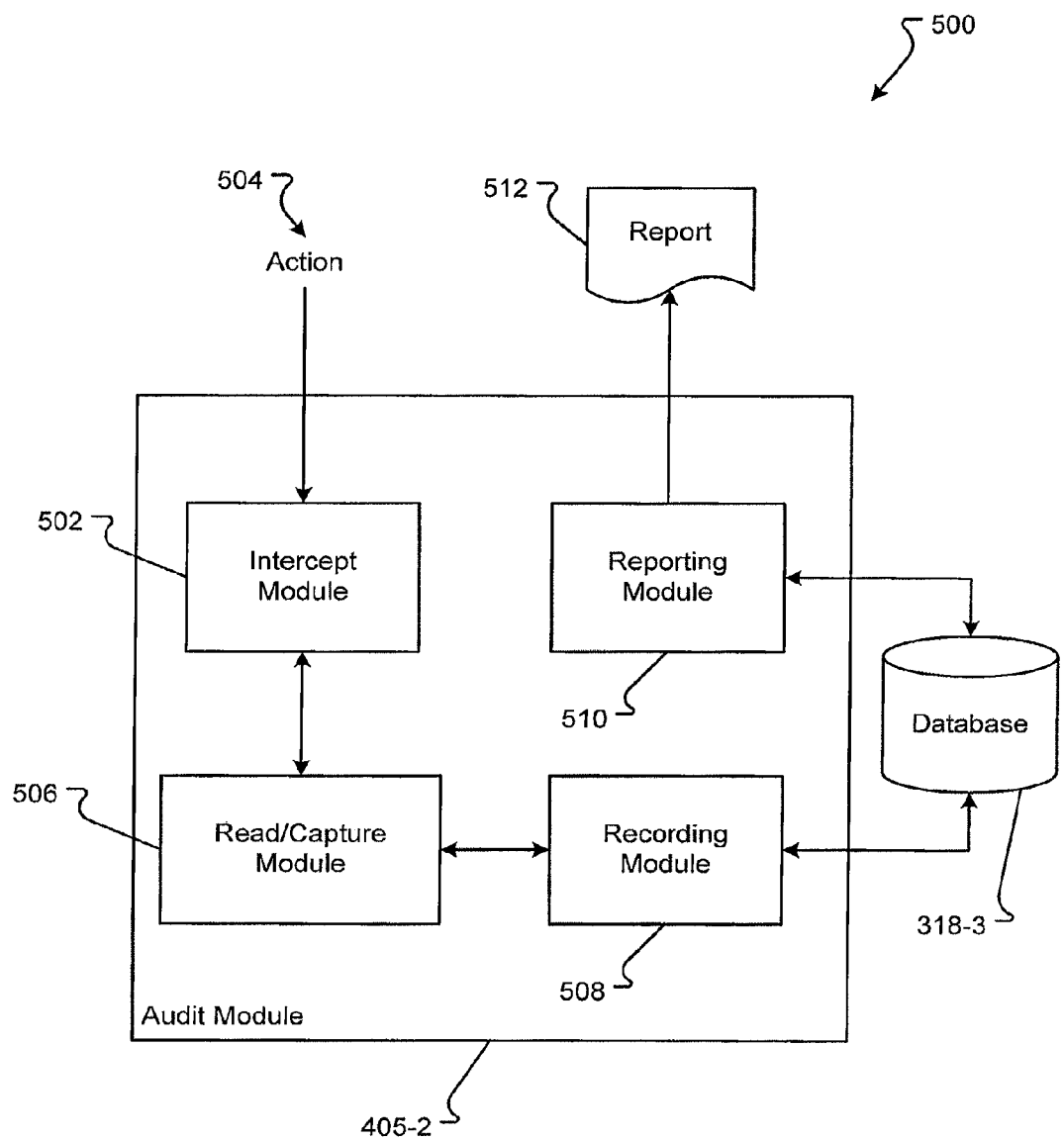
FIG. 5 is a block diagram of an embodiment of an audit module in the archival management system.

An embodiment of the audit module 405-2 is shown in FIG. 5. In embodiments, the audit module 405-2 comprises an intercept module 502, a read/capture module 506, a recording module 508, and a reporting module 510. The intercept module 502 can intercept actions 504 being processed by the network storage system 302 (FIG. 3). An action 504 can be any process completed by the network storage system 302 (FIG. 3). In embodiments, an action 504 is a request by an application server, other entity, or an internal process that will affect archived data. For example, an action 504 may be a request to store data into the network storage system 302 (FIG. 3), a request to access data, a request to delete data, a process that deletes data automatically, etc.

The intercept module 502, in embodiments, reads the program stack of the archival management system 310-2 (FIG. 3). The program stack is, in embodiments, the ordered collection of software processes that the archival management system 310-2 (FIG. 3) executes. Every time an action 504 is received or requested, the action 504 is placed into the program stack. In one embodiment, the intercept module 502 intercepts the action 504 before being placed in the program stack. In other embodiments, the action 504 is placed in the program stack and then read by the intercept module 502.

The intercept module 502 can also determine if the action 504 is a process that is to be recorded in the audit trail. If the action 504 should be recorded in the audit trail, the intercept module 502, in embodiments, signals the read/capture module 506 to read the data associated with the action 504. In embodiments, the intercept module 502 passes the data associated with the action 504 to the read/capture module 506.

The read/capture module 506, in embodiments, reads one or more portions of data or metadata associated with the action 504. Each action 504 can include data or metadata that can describe the action 504. For example, the data or metadata about the action 504 includes the type of action, an identifier of the requester, the time of the action, the date of the action, etc. The read/capture module 506 can determine which portions of the data or metadata are to be recorded in the audit trail. In embodiments, the read/capture module 506 reads the selected data and passes the selected data to the recording module 508.

In embodiments, the recording module 508 records the data into the audit trail. The recording module 508 receives the data from the read/capture module 506 that will be placed into the audit trail. The audit trail, in embodiments, is stored in the database 318-3. The audit trail is explained in conjunction with FIGS. 6A-6H. If a record is not created in the database 318-3 for the data associated with the action 504, the recording module 508 can create a record. After creating the record, the recording module 508 writes the data into the audit trail record in the database 318-3.

The reporting module 510, in embodiments, responds to requests to read the audit trail. The reporting module 510 can respond to the request by reading the data from the audit trail record in the database 318-3. In embodiments, the reporting module 510 presents the audit trail record in a report 512 that can be sent to the requester or provided to the requester. An embodiment of the report 512 is explained in conjunction with FIG. 7. The report 512 may be emailed to the requester, displayed on a display device, or provided by other processes or functions.

Figure 6A:
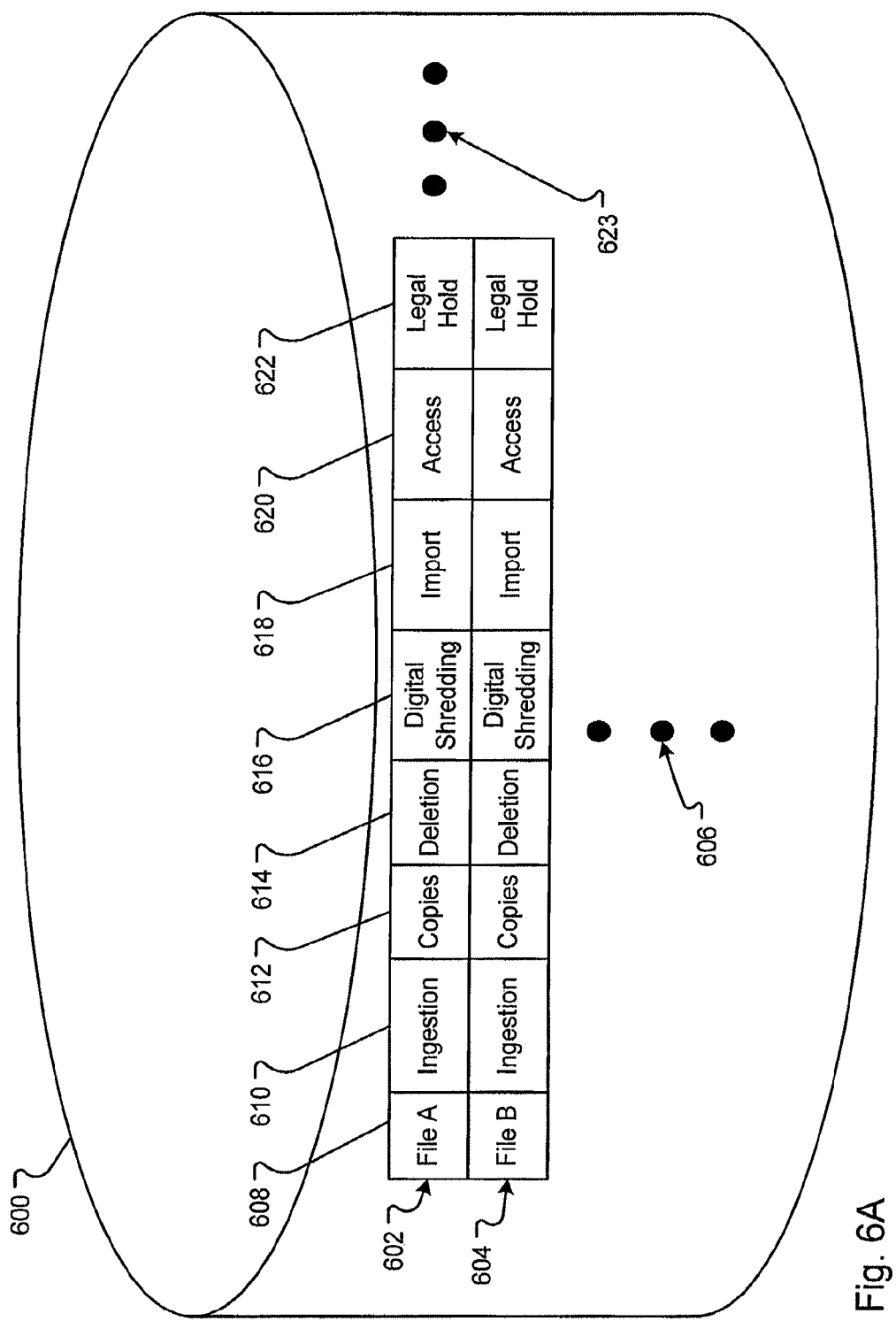

An audit trail database 600 is shown in FIG. 6. In embodiments, the audit trail database 600 is a portion of the database 318-3 (FIG. 5). The audit trail database 600, in embodiments, comprises one or more audit trail records 602 and/or 604. The audit trail database 600 can comprise more than the two audit trail records 602 and 604 shown in FIG. 6A, as represented by the ellipses 606. In one embodiment, the audit trail records 602 and 604 are recorded in the audit trail database 600 in sequential order according to the date and/or time of the action 504 (FIG. 5). In an alternative embodiment, the audit trail records 602 and 604 are recorded in the audit trail database 600 in one or more files associated with the data for which the action 504 (FIG. 5) is associated. The data within the files may then be in sequential order.

In embodiments, the audit trail record 602 or 604 includes one or more of a file identifier 608, ingestion data 610, copies data 612, deletion data 614, digital shredding data 616, import data 618, access data 620, and legal hold data 622. There may be more data in the audit trail records 602 and 604 as represented by ellipses 623. In embodiments, the file identifier 608 is an identifier for the file holding the data in the network storage system 302 (FIG. 3). The file identifier 608 may be a Globally Unique Identifier (GUID). In other embodiments, the file identifier 608 is a file name. In an alternative embodiment, the file identifier 608 is the file identifier for the record in the audit trail 600 rather than the file in the RDA or active archive.

The ingestion data 610 (FIG. 6A) is as explained in conjunction with FIG. 6B. Likewise, copies data 612, deletion data 614, digital shredding data 616, import data 618, access data 620, and legal hold data 622, are as explained in conjunction with FIG. 6C, FIG. 6D, FIG. 6E, FIG. 6F, FIG. 6G, and FIG. 6H, respectively. Ingestion data 610 is about the storage of data into the archiving system. In embodiments, the ingestion data 610 includes a source identifier 624, a time stamp 626, a date stamp 628, a location 630 of where the data is stored in the archiving system, a protection field 632, and an attributes field 634. The ingestion data field 610 may have fewer fields than those shown in FIG. 6B or more fields, as represented by ellipses 635.

The source identifier field 624 is, in embodiments, an identifier for the application server or other source that is sending the data to be archived. In embodiments, the source identifier 624 is a GUID or other identifier for the source. The source identifier 624 may also be a name or other identifier for the source.

The time field 626 is a time stamp for the time the data was ingested into the archiving system. In embodiments, the time stamp 626 is a time based on Greenwich Mean Time (GMT). In alternative embodiments, the time stamp 626 is a local time or system time with an identification of the locality (e.g., time zone, state, city, etc.) or the system identifier. The date field 628 is a date the data was ingested.

The location field 630 is a location where the data was stored in the archiving system. In embodiments, the location field 630 includes the identifiers for one or more removable disk drives that store the data. In further embodiments, the location field 630 also includes memory addresses or file identifiers for where the data is stored in the active archive.

The protection field 632 includes one or more protections that have been placed on the archived data. For example, the protections may include encryption or WORM protection. The protection field 632 may include a flag for each protection used. In alternative embodiments, the protection field 632 includes the types of protections listed, such as AES 256, and any keys or other data used for the protection.

The attributes field 634 includes one or more attributes about the data. For example, the size of the data, the type of data, etc. In embodiments, the attributes field 634 includes the metadata about the data stored in the archive system. The attribute data 634 may be used to determine if the data has been altered.

The copies data 612 (FIG. 6A), in embodiments, is as shown in FIG. 6C. Copies data 612 (FIG. 6A) includes data about copying of the archived data. The copies data 612 (FIG. 6A) may include an initiator identifier 636, a time stamp 638, a date field 640, a media identification field 642, and a format field 644. The copies data field 612 (FIG. 6A) may have fewer fields than those shown in FIG. 6C or more fields, as represented by ellipses 645. In embodiments, the time stamp 638 and the date field 640 are similar to the time stamp 626 and the date field 628 described in conjunction with FIG. 6B. The initiator identifier 636 is, in embodiments, an identifier for the system or user that requested that the archived data be copied. In an embodiment, the initiator identifier 636 is a QUID for the initiator. In other embodiments, the initiator identifier 636 is a name, such as a user name used for a login, or other identifier.

In embodiments, the media identification 642 is an identifier for the media onto which the data was copied and/or an identifier for the media from which the data was copied. The identifier 642 may be a GUID or an identification for a removable disk drive, such as a bar code or other data.

The format field 644 may include one or more items of data describing the format into which the data was copied. For example, if the data was encrypted or other type of format, the format field 644 includes this information. The format fields 644 may be a series of flags, which are set if format is used, or may be a listing of the formats.

The deletion data 614 (FIG. 6A), in embodiments, is shown in FIG. 6D, and includes one or more of a time stamp 646, a date field 648, and/or a reason field 650. The deletion data 614 (FIG. 6A) may also include fewer fields than those shown in FIG. 6D or more fields, as represented by ellipses 651. In embodiments, the time stamp 646 and the date field 648 are similar to the time stamp 626 and the date field 628 described in conjunction with FIG. 6B. The reason field 650 is, in embodiments, an explanation for why the archived data was deleted. In embodiments, the reasons include expiration of a time period for archiving the data, expiration of a time period for keeping the data in the active archive, request from a user or system, etc. The reason field 650 may include flags or a list of the reasons. In an alternative embodiment, the user or system can write a narrative into the reason field 650. In further embodiments, the deletion data 614 (FIG. 6A) may also include an identifier field (not shown) similar to the initiator field 636 described in conjunction with FIG. 6C.

An embodiment of the digital shredding data 616 (FIG. 6A) is as shown in FIG. 6E. Digital shredding data includes data about digital shredding, which is a specially conducted deletion of the archived data. The digital shredding data 616 (FIG. 6A) may include one or more of request field 652 and a digital shred field 654. The digital shredding data may include more data, as represented by ellipses 655. In embodiments, the request field 652 includes a time stamp 656 and a date field 658. The digital shred field 654, in embodiments, also includes a time stamp 660 and a date field 662. In embodiments, the time stamps 656 and 660 and the date fields 658 and 662 are similar to the time stamp 626 and the date field 628 described in conjunction with FIG. 6B. However, the request field 652 includes the data of when the request for a digital shred was received, and the digital shred field 654 includes the data of when the digital shred was performed. These times and dates may be different because a requested removable disk drive may be in storage, it may need to be retrieved from storage (which may be in another physical location), and then it may be inserted into the system. Thus, there may be a delay between the request and the digital shred. In further embodiments, the request field 652 also includes an identifier field (not shown) similar to the initiator field 636 described in conjunction with FIG. 6C.

In embodiments, the import data 618 (FIG. 6A) is as shown in FIG. 6F. The import data 618 (FIG. 6A), in embodiments, records information about imports of previously archived data into the archiving system. The import data 618 (FIG. 6A) may include one or more of a time stamp 664, a date field 668, a reason field 670, a source identifier 672, and a location field 674. The import data field 618 (FIG. 6A) may have fewer fields than those shown in FIG. 6F or more fields, as represented by ellipses 675. In embodiments, the time stamp 664 and the date field 668 are similar to the time stamp 626 and the date field 628 described in conjunction with FIG. 6B. The reason field 670 is, in embodiments, an explanation for why the archived data was imported. In embodiments, the reasons include the merging of systems, the accidental deletion of data from the active archive, etc. The reason field 670 may include flags or a list of the reasons. In an alternative embodiment, the user or system can write a narrative into the reason field 670.

The source identifier field 672 is, in embodiments, an identifier for the application server or other source that is importing the data into the archiving system. In embodiments, the source identifier 672 is a GUID or other identifier for the source. The source identifier 672 may also be a name or other identifier for the source. The location field 674 is a location where the imported data was stored in the archiving system. In embodiments, the location field 674 includes the identifiers for one or more removable disk drives that store the data. In further embodiments, the location field 674 also includes memory addresses or file identifiers for where the data is stored in the active archive.

Figure 6G:
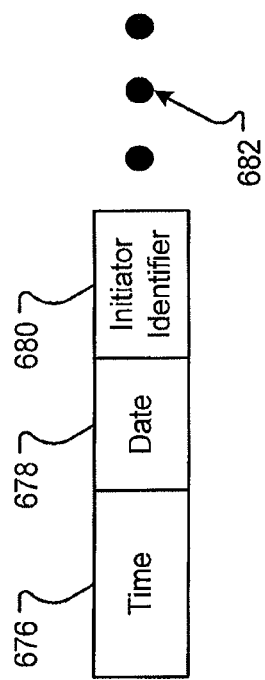

An embodiment of the access data 620 (FIG. 6A) is shown in FIG. 6G. The access data 620 (FIG. 6A) records information about access of the archived data. The access data 620 (FIG. 6A) may include one or more of a time stamp 676, a date field 678, and an initiator identifier 680. In embodiments, the access data 620 (FIG. 6A) includes fewer fields than those shown in FIG. 6G or more than those fields shown in FIG. 6G, as represented by ellipses 682. In embodiments, the time stamp 676 and the date field 678 are similar to the time stamp 626 and the date field 628 described in conjunction with FIG. 6B. Further, the initiator identifier field 680 is similar to the initiator field 636 described in conjunction with FIG. 6C.

Figure 6H:
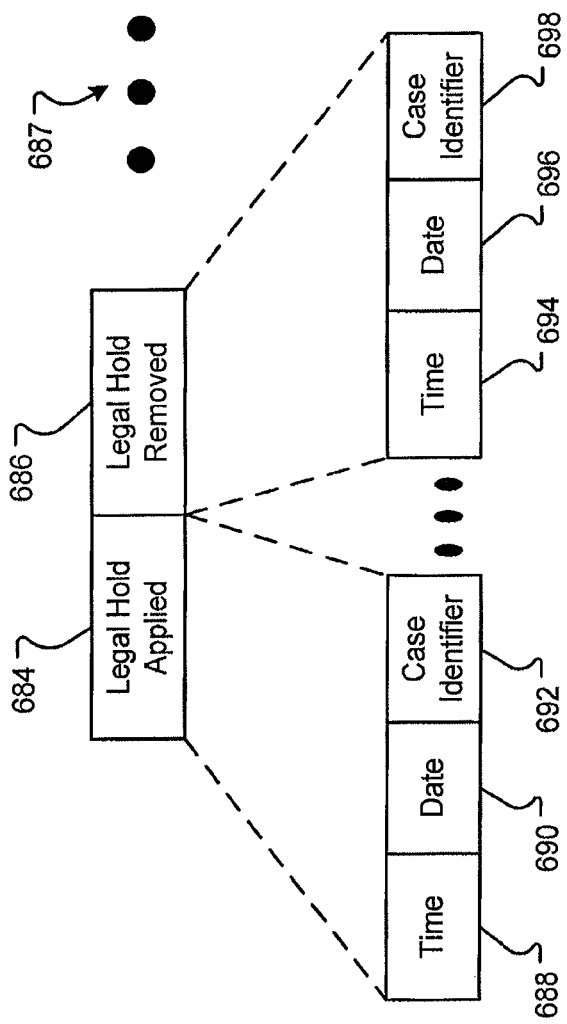

In embodiments, legal hold data 622 (FIG. 6A) is as shown in FIG. 6H. Legal holds are placed on data when the data is pertinent to a legal court case. A legal hold prevents the data from being deleted. In embodiments, legal hold data 622 (FIG. 6A) includes one or more of, but is not limited to, a legal hold applied field 684 and a legal hold removed field 686. The legal hold data 622 (FIG. 6A) may have more fields, as represented by ellipses 687. In embodiments, the legal hold applied field 684 records when the legal hold was applied to the data. The legal hold applied field 684 includes one or more of, but is not limited to, a time stamp 686, a date field 690, and a case identifier 692. The legal hold removed field 688, in embodiments, represents when the legal hold should be removed and/or when the legal hold was removed. In further embodiments, the legal hold removed field 686 includes one or more of, but is not limited to, a time stamp 694, a date field 696, and a case identifier 698.

In embodiments, the time stamps 688 and 694 and the date fields 690 and 696 are similar to the time stamp 626 and the date field 628 described in conjunction with FIG. 6B. The case identifiers 692 and 698 are identifiers for the court case that require the legal hold. In embodiments, there is more than one case identifier 692 and 698 because the data may be subject to more than one legal hold. The case identifier 692 and 698 may be a case name, e.g., Colorado v. Williams, a court docket number, or some other identifier.

In alternative embodiments, the time stamp and date field included in many of the data fields is listed with the file identifier 608 (FIG. 6A). As such, only one time stamp and date field is recorded for the action. In embodiments, if there is one time stamp and date field for the action, a flag may be set in one or more of the other fields to represent which type of action was completed.

Figure 7:
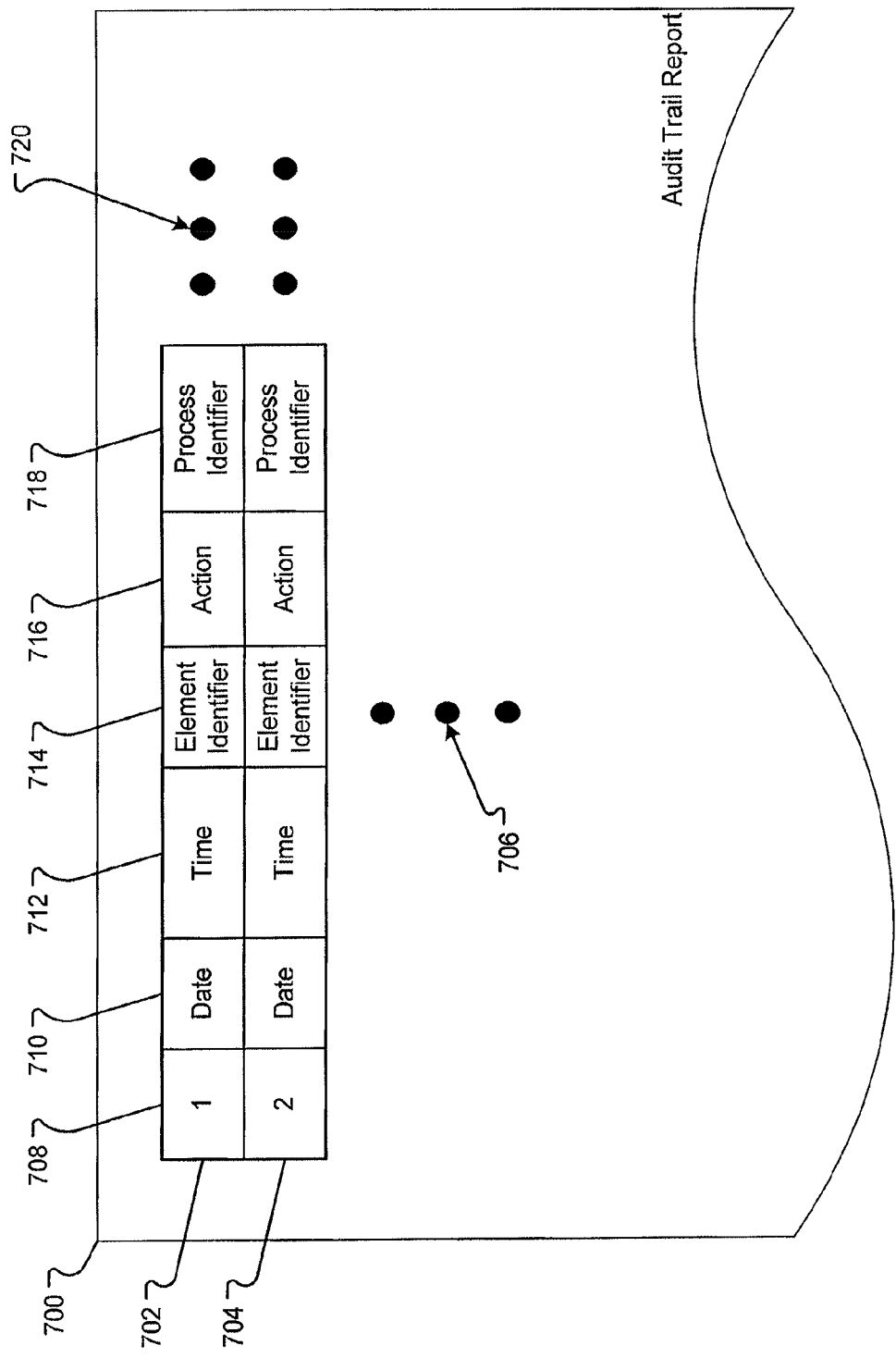
FIG. 7 is a block diagram of an embodiment of an audit trail report.

In embodiments, an audit trail report 700 is shown in FIG. 7. The audit trail report 700 is, in embodiments, similar to or the same as report 512 (FIG. 5). The audit trail report 700 provides a listing of actions completed on the archived data. In embodiments, the audit trail report 700 may be a simple sequential list of actions. In alternative embodiments, the audit trail report 700 is organized by file and then sequentially ordered. The audit trail report 700 may include one or more audit trail records 702 and/or 704. The audit trail report 700 may include fewer records than those shown in FIG. 7 or more records, as represented by ellipses 706.

In embodiments, an audit trail record 702 comprises one or more of a record identifier 708, a date field 710, a time stamp 712, an element identifier 714, an action field 716, and a process identifier 718. The audit trail record 702 may include more fields than those shown in FIG. 7, as represented by ellipses 720. The record identifier 708, in embodiments, is an identifier for the record in the audit trail report 700. The record identifiers 708 may be a sequential list of numbers, wherein any one record identifier 708 represents the audit trail record's place in the sequential list. In other embodiments, the record identifier 708 is the file identifier 608 (FIG. 6A) in the audit trail 600 (FIG. 6A). The record identifier 708 may also be a GUID for the record.

The date field 710 is, in embodiments, the date at which the action recorded in the audit trail database 600 (FIG. 6A) was completed. In embodiments, the date field 710 includes the same information as date fields 628 (FIG. 6B), 638 (FIG. 6C), 648 (FIG. 6D), 658 (FIG. 6E), 662 (FIG. 6E), 668 (FIG. 6F), 678 (FIG. 6G), 690 (FIG. 6H), or 696 (FIG. 6H). Similarly, the time stamp 712 is, in embodiments, the time at which the action recorded in the audit trail database 600 (FIG. 6A) was completed. In embodiments, the time stamp 712 includes the same information as time stamps 626 (FIG. 6B), 638 (FIG. 6C), 646 (FIG. 6D), 656 (FIG. 6E), 660 (FIG. 6E), 664 (FIG. 6F), 676 (FIG. 6G), 688 (FIG. 6H), or 694 (FIG. 6H).

In embodiments, the element identifier 714 identifies the file within the archiving system. For example, the element identifier 714 holds the same information as the file identifier 608 (FIG. 6A). In other embodiments, the element identifier 714 is the GUID for the data in the archiving system. The action identifier 716, in embodiments, is an identifier for the type of action that caused the recording of the audit trail record 702. For example, the action could be an ingest, a copy, an access, a delete, etc. The action identifier could be several fields, each field representing a different type of action, with a flag set in one of the fields representing the action that was taken. In another embodiment, the action field 716 simply lists the action, e.g., ingest, copy, etc.

The process identifier 718, in embodiments, is the process or entity that requested the action. For example, the process identifier 718 may include the GUID of the application server that requested data to be ingested. In other embodiments, the process identifier 718 also identifies the process, for example, a scheduled delete from the active archive that caused the action on the data.

Figure 8:
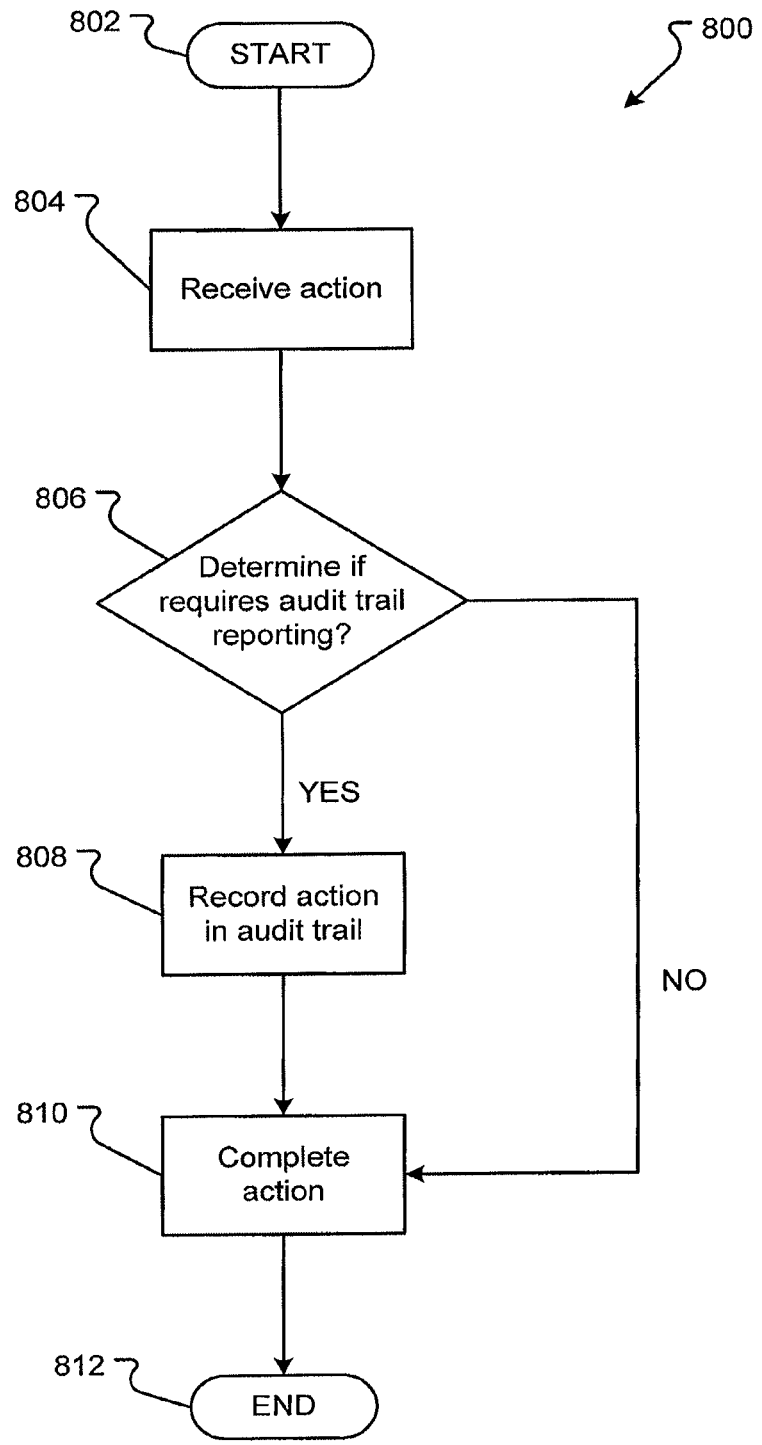
FIG. 8 is a flow diagram of an embodiment of a method for creating an audit trail.

A method 800 for recording an entry in the audit trail is shown in FIG. 8. In embodiments, the method 800 generally begins with a START operation 802 and terminates with an END operation 812. The steps shown in the method 800 may be executed in a computer system as a set of computer executable instructions. While a logical order is shown in FIG. 8, the steps shown or described can, in some circumstances, be executed in a different order than presented herein.

Receive operation 804 receives an action. In embodiments, archival management system 310-2 (FIG. 4) receives an action. The action may be any operation associated with the archival data, for example, an ingest, an access, a delete, etc. In further embodiments, an intercept module 502 (FIG. 5) of the audit module 405-2 (FIG. 5) receives and reads the action and information about the action.

Determine operation 806 determines if the action requires an audit trail reporting. In embodiments, the intercept module 502 (FIG. 5) determines if the action intercepted requires an entry in the audit trail. One or more actions may require an entry in the audit trail. For example, any action changing the archived data, such as a delete or an ingest action, may be entered in the audit trail. One or more actions may not need an entry in the audit trail. If the action does not require an entry in the audit trail, the method flows NO to complete operation 810. If the action does require an entry in the audit trail, the method flows YES to record operation 808.

Record operation 808 records the action into the audit trail. The intercept module 502 (FIG. 5), in embodiments, passes a signal to a read/capture module 506 (FIG. 5) to read the information about the action. In embodiments, the read/capture module 506 (FIG. 5) reads one or more items of information from the metadata or other information passed with the action request. This read information may then be passed to a recording module 508 (FIG. 5). In embodiments, the recording module 508 (FIG. 5) creates an audit trail record 602 (FIG. 6A) in the audit trail database 600 (FIG. 6A). The information passed from the read/capture module 506 (FIG. 5) is then stored in the audit trail record 602 (FIG. 6) and stored in the database 318-3 (FIG. 5).

Complete action 810 completes the action. In embodiments, the archival management system 310-1 (FIG. 3) completes the action requested. For example, if the request was to store new archival data, the archival management system 310-1 (FIG. 3) stores the data into one or more removable disk drives 102-3 (FIG. 3).

Figure 9:
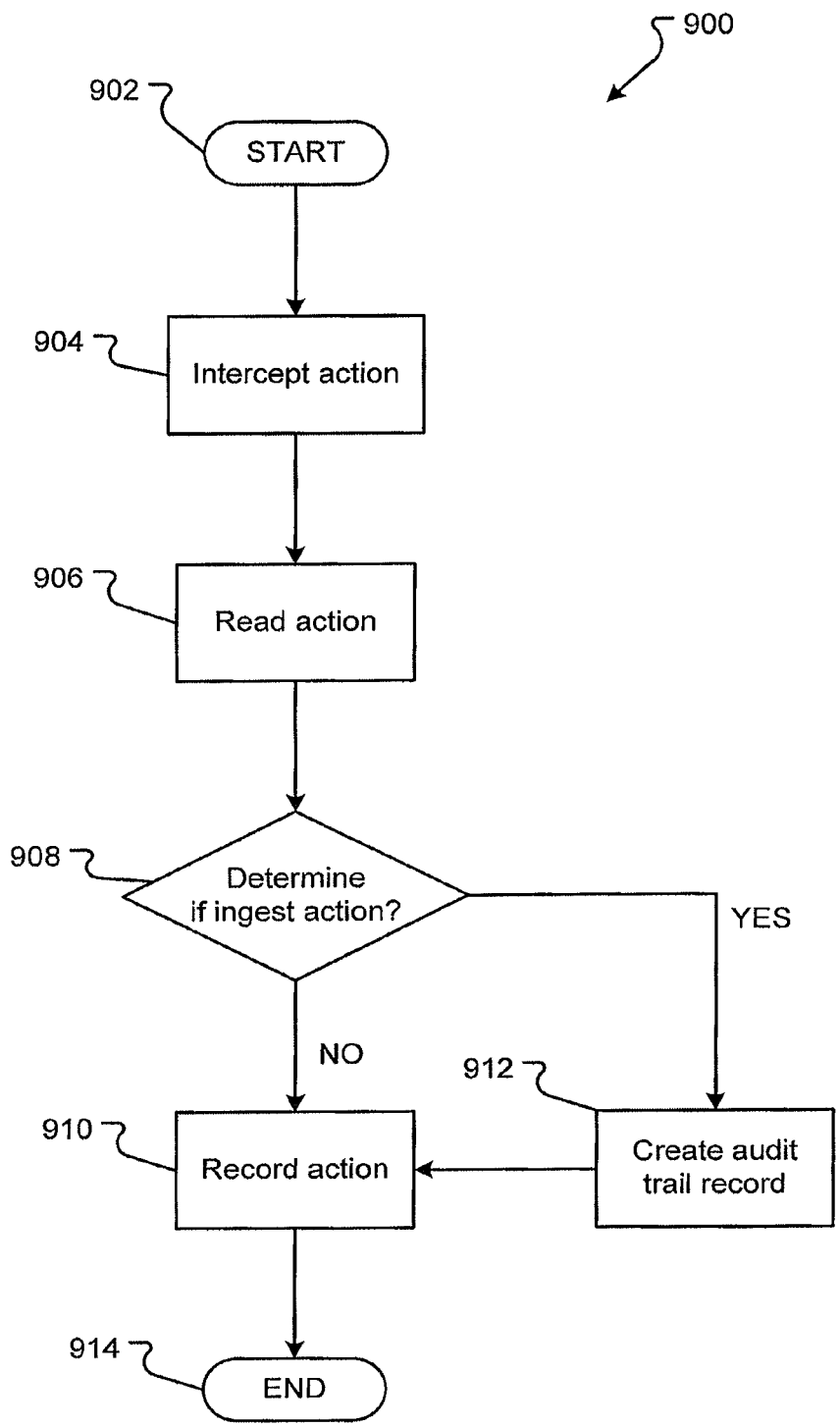
FIG. 9 is a flow diagram of another embodiment of a method for creating an audit trail.

Another embodiment of a method 900 for recording an entry in the audit trail is shown in FIG. 9. In embodiments, the method 900 generally begins with a START operation 902 and terminates with an END operation 914. The steps shown in the method 900 may be executed in a computer system as a set of computer executable instructions. While a logical order is shown in FIG. 9, the steps shown or described can, in some circumstances, be executed in a different order than presented herein.

Intercept operation 904 intercepts an action. In embodiments, an intercept module 502 (FIG. 5) of the audit module 405-2 (FIG. 5) receives and reads the action and information about the action. The intercept module 502 (FIG. 5), in embodiments, receives the actions before the actions are placed on the stack for the archival management system 310-2 (FIG. 4) and then forwards the action to the archival management system 310-2 (FIG. 4). In other embodiments, the intercept module 502 (FIG. 5) reads the actions from the stack as the actions are placed on the stack.

Read operation 906 reads the action information. In embodiments, the read/capture module 506 (FIG. 5) reads one or more items of information from the metadata or other information passed with the action request. This read information may then be passed to a recording module 508 (FIG. 5).

Determine operation 908 determines if the action is an ingest action. The recording module 508 (FIG. 5), in embodiments, determines if the action is a request to store data in the archiving system. If the action is to store new archival data in the archiving system, the method flows YES to create operation 912. If the action is something other than to store new archival data in the archiving system, the method flows NO to record operation 910.

Create operation 912 creates an audit trail record. In embodiments, the recording module 508 (FIG. 5) creates an audit trail record 602 (FIG. 6A) in the database 318-3 (FIG. 5). The recording module 508 (FIG. 5) may then enter the information received from the read/capture module 506 (FIG. 5) into the audit trail record 602 (FIG. 6A).

Record operation 910 records the action into the audit trail. In embodiments, the recording module 508 (FIG. 5) receives the information passed from the read/capture module 506 (FIG. 5) and stores the information in the audit trail record 602 (FIG. 6A) stored in the database 318-3 (FIG. 3).

In light of the above description, a number of advantages of the present disclosure are readily apparent. For example, a digital record of the actions completed on the archived data is maintained. The audit trail provides more flexibility as any action may be completed on the archived data without limiting the actions. As such, more actions may be completed on the archived data and recorded in the audit trail. Further, the audit trail is easily retrieved and reviewed.

A number of variations and modifications of the disclosure can also be used. For example, the audit trail may also be stored in a removable disk drive for long-term storage. As such, the audit trail can be maintained nearly indefinitely. Further, controls, such as WORM protection, may be applied to the audit trail stored in the removable disk drive.

While the principles of the disclosure have been described above in connection with specific apparatuses and methods, it is to be clearly understood that this description is made only by way of example and not as limitation on the scope of the disclosure.

What is claimed is:

1. An archival data storage system comprising:
   a plurality of removable drives for storing archival data, each removable drive comprising a data cartridge case and memory configured to store the archival data;
   a plurality of drive ports, each drive port including a data cartridge connector configured to mate with one of the removable drives in order to communicate with the memory, wherein:

each drive port is in communication with a server for receiving the archival data; and each drive port is separately addressable for sending the archival data to the memory for storage;

a database for storing an audit trail for archival actions associated with the archival data; and an archival management system in communication with the server and the database, the archival management system configured to:

receive requests for archival actions from the server;

create new entries in the audit trail for requests to store new archival data;

identify existing entries in the audit trail for requests associated with previously stored archival data; and place a legal hold on archival data pertinent to a court case.

2. The system of claim 1, further comprising an intercept module for determining whether the requests would change the archival data.

3. The system of claim 2, wherein the archival management system is further configured to complete requests determined not to change the archival data without creating the new entries or identifying the existing entries.

4. The system of claim 1, wherein the archival management system is configured to prevent deletion of the archival data based on the legal hold.

5. The system of claim 4, wherein the legal hold includes a case identifier for the court case, and wherein the court case requires the legal hold.

6. The system of claim 4, wherein the archival management system is further configured to remove the legal hold.

7. The system of claim 6, wherein the archival management system is configured to delete the archival data in response to a corresponding request from the server, when not prevented by the legal hold.

8. The system of claim 7, wherein the archival management system is configured to delete the archival data by digital shredding, when not prevented by the legal hold.

9. The system of claim 1, wherein the memory is comprised within a magnetic data storage medium.

10. The system of claim 1, wherein the memory is comprised within a flash memory storage medium.

11. A network storage system comprising the archival data storage system of claim 1, wherein the archival management system is in communication with a plurality of servers for receiving the requests over an internet.

12. An archival data storage method comprising:

receiving archival data from a server for storage on a plurality of data cartridges, each data cartridge comprising a case enclosing memory on a data storage medium configured to store the archival data;

addressing the data cartridges via a plurality of drive ports, each drive port including a data cartridge connector configured to mate with one of the removable drives in order to communicate with the memory;

sending the archival data to the addressed data cartridges for storage in the memory;

receiving requests for the archival data from the server;

determining whether the requests would change the archival data;

recording an audit trail for the requests determined to change the archival data, wherein recording the audit trail comprises:

creating entries for information associated with requests to store new archival data;

identifying entries for information associated with requests for previously stored archival data; and placing a legal hold to prevent deletion of archival data pertinent to a court case.

13. The method of claim 12, further comprising completing requests determined not to change the archival data without recording the audit trail.

14. The method of claim 12, further comprising removing the legal hold.

15. The method of claim 14, further comprising deleting the archival data pertinent to the court case, when not prevented by the legal hold.

16. The method of claim 15, wherein deleting the archival data comprises digitally shredding the archival data pertinent to the court case, when not prevented by the legal hold.

17. The method of claim 16, further comprising reporting a record of the audit trail, the record of the audit trail comprising date and action fields for the requests determined to change the archival data.

18. A data archive comprising:

a plurality of removable data cartridges comprising data storage media having memory configured to store archival data;

a plurality of drive ports comprising data cartridge connectors configured to mate with the removable data cartridges in order to communicate with the memory, wherein each drive port is separately addressable;

a server in communication with the plurality of drive ports, the server configured to receive the archival data and send the archival data to the drive ports for storage on the data cartridges;

an archive manager in communication with the server and a database, the archival manager configured to:

receive requests for the archival data from the server;

determine whether the requests would change the archival data;

record an audit trail in the database for the requests determined to change the archival data, the audit trail comprising:

new entries for requests to store new archival data;

existing entries for requests associated with previously stored archival data; and a legal hold on archival data pertinent to a court case.

19. The data archive of claim 18, wherein the plurality of removable data cartridges comprise magnetic data storage media having the memory configured to the store archival data.

20. The data archive of claim 18, wherein the legal hold prevents deletion of the archival data pertinent to the court case.

21. The data archive of claim 20, wherein the audit trail further comprises a removal of the legal hold.

22. The data archive of claim 21, wherein the archival management system is configured for digitally shredding the data in response to a corresponding request from the server, when not prevented by the legal hold.

* * * * *